US008673186B2

(12) United States Patent
Jenkins et al.

(10) Patent No.: US 8,673,186 B2
(45) Date of Patent: *Mar. 18, 2014

(54) FABRICATION OF AN OPTICAL WEDGE

(75) Inventors: Kurt Allen Jenkins, Sammamish, WA (US); Timothy Large, Bellevue, WA (US); Rajesh Manohar Dighde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

This patent is subject to a terminal disclaimer.

(21) Appl. No.: 12/779,790

(22) Filed: May 13, 2010

(65) Prior Publication Data

US 2011/0215491 A1 Sep. 8, 2011

Related U.S. Application Data

(60) Provisional application No. 61/309,702, filed on Mar. 2, 2010.

(51) Int. Cl.
*B29D 11/00* (2006.01)
(52) U.S. Cl.
USPC ............ 264/1.24; 264/1.38; 264/1.7; 264/2.7
(58) Field of Classification Search
USPC ........... 264/1.1, 1.24, 1.7, 2.5, 1.36, 1.38, 2.7
See application file for complete search history.

(56) References Cited

U.S. PATENT DOCUMENTS

| 6,124,906 | A | 9/2000 | Kawada et al. |
|---|---|---|---|
| 6,440,334 | B2 | 8/2002 | Currens et al. |
| 6,799,860 | B2 | 10/2004 | Nakaoka et al. |
| 6,895,164 | B2 | 5/2005 | Saccomanno |
| 7,607,814 | B2 | 10/2009 | Destain |
| 7,654,722 | B2 | 2/2010 | Chen et al. |
| 2005/0041178 | A1* | 2/2005 | Taniguchi et al. ............... 349/65 |
| 2008/0271776 | A1 | 11/2008 | Morgan |
| 2010/0014318 | A1 | 1/2010 | Chi et al. |
| 2010/0160904 | A1* | 6/2010 | McMillan et al. ............... 606/16 |

FOREIGN PATENT DOCUMENTS

| JP | 08043605 A | 2/1996 |
|---|---|---|
| JP | 2001062874 A | 3/2001 |
| JP | 3578725 B2 | 10/2004 |
| JP | 3823964 B2 | 9/2006 |
| KR | 100450715 B1 | 10/2004 |
| WO | 9619340 A1 | 6/1996 |
| WO | 2009153326 A1 | 12/2009 |

OTHER PUBLICATIONS

"International Search Report", Mailed Date: Nov. 28, 2011, Application No. PCT/US2011/026731, Filed Date: Mar. 1, 2011, pp. 8. (MS# 329460.03).
"Light Guide Techniques Using LED Lamps", Retrieved at << http://www.ciri.org.nz/downloads/Lightpipe%20design.pdf >>, Dec. 7, 2001, pp. 22.
State Intellectual Property Office of China, Office Action of Chinese Patent Application No. 201180012083.0, Aug. 2, 2013, 7 pages.

* cited by examiner

*Primary Examiner* — Mathieu D. Vargot
(74) *Attorney, Agent, or Firm* — Bryan Webster; Andrew Sanders; Micky Minhas (57) ABSTRACT

Various embodiments are disclosed relating to fabrication of an optical wedge. For example, one embodiment provides a method for manufacturing an optical wedge comprising inserting a wedge blank into a vacuum molding tool and applying a vacuum to the vacuum molding tool to temporarily hold the wedge blank against a molding surface of the vacuum molding tool. The method further comprises removing a layer from a top surface of the wedge blank to expose a machined surface of the wedge blank, and casting a finish layer on the machined surface to form a finish layer of a finished optical wedge.

12 Claims, 7 Drawing Sheets

FABRICATION OF AN OPTICAL WEDGE

CROSS REFERENCE TO RELATED APPLICATIONS

This application claims priority to U.S. Provisional Application No. 61/309,702, filed Mar. 2, 2010, the entirety of which is hereby incorporated herein by reference.

BACKGROUND

An optical wedge is a wedge-shaped light guide configured to transmit light between a first light interface located at an end of the light guide and a second light interface located at a major face of the light guide via total internal reflection. Such guides may be image-retaining where there is a one-to-one correspondence between an angle of image light at the edge and a position of the image light at a surface of the wedge. Thus, light input into the first light interface within a suitable range of input angles propagates through the optical wedge until the critical angle of internal reflection is reached, thereby allowing the light to be transmitted out of the optical wedge through the second interface. Depending upon the design of a particular optical wedge, the first light interface may be either at a thin end or a thick end of the optical wedge. In either case, the internal reflection of light within the optical wedge allows light to fan out to a desired beam size within a relatively small volume of space, and therefore may permit the construction of a relatively compact optical system compared to a similar system without an optical wedge.

SUMMARY

Various embodiments are disclosed herein that relate to fabrication of an optical wedge. For example, one embodiment provides a method for manufacturing an optical wedge, the method comprising inserting a wedge blank into a vacuum molding tool and applying a vacuum to the vacuum molding tool to temporarily hold a surface of the wedge blank against a surface of the vacuum molding tool. The method further comprises removing a layer from a top surface of the wedge blank to expose a machined surface of the wedge blank, and casting a finish layer on the machined surface to form a finished optical wedge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, surface smoothness and dimensional accuracy may be goals in the fabrication of an optical wedge. In some applications, a thickness tolerance of approximately 1% of the maximum thickness of the wedge may be needed to achieve desired optical performance. For example, surface ripples having a period approaching a magnitude of a beam width of a projection device may cause degradation in image focus, which may be magnified over the course of multiple reflections from the rippled surface. Accordingly, in some applications, surface roughness may be controlled to 1 micron per 20 mm maximum gradient deviation.

However, manufacturing an optical wedge with such properties may pose various challenges. For example, a PMMA (poly(methyl methacrylate)) extruded optical wedge may have surface roughness on the order of 10 nm RA arising from the extrusion aperture, which is well above the <2 nm RA desired for some applications. An optical wedge cast between two float glass sheets may have acceptable smoothness. However, PMMA may shrink by approximately 12-24% during curing. Due to the non-uniform thickness of an optical wedge, this shrinkage may result in poor thickness profile tolerance, leading to loss of functionality.

Accordingly, various embodiments are provided herein that relate to manufacturing an optical wedge in a manner that may help to avoid such issues. It will be appreciated that the schematic views presented herein are greatly exaggerated for illustrative purposes. Further, it will be appreciated that the wedge profiles presented in these exaggerated schematic views are merely example wedge profiles, and that any suitable wedge profile may be achieved within the scope of the present disclosure.

Figure 1:
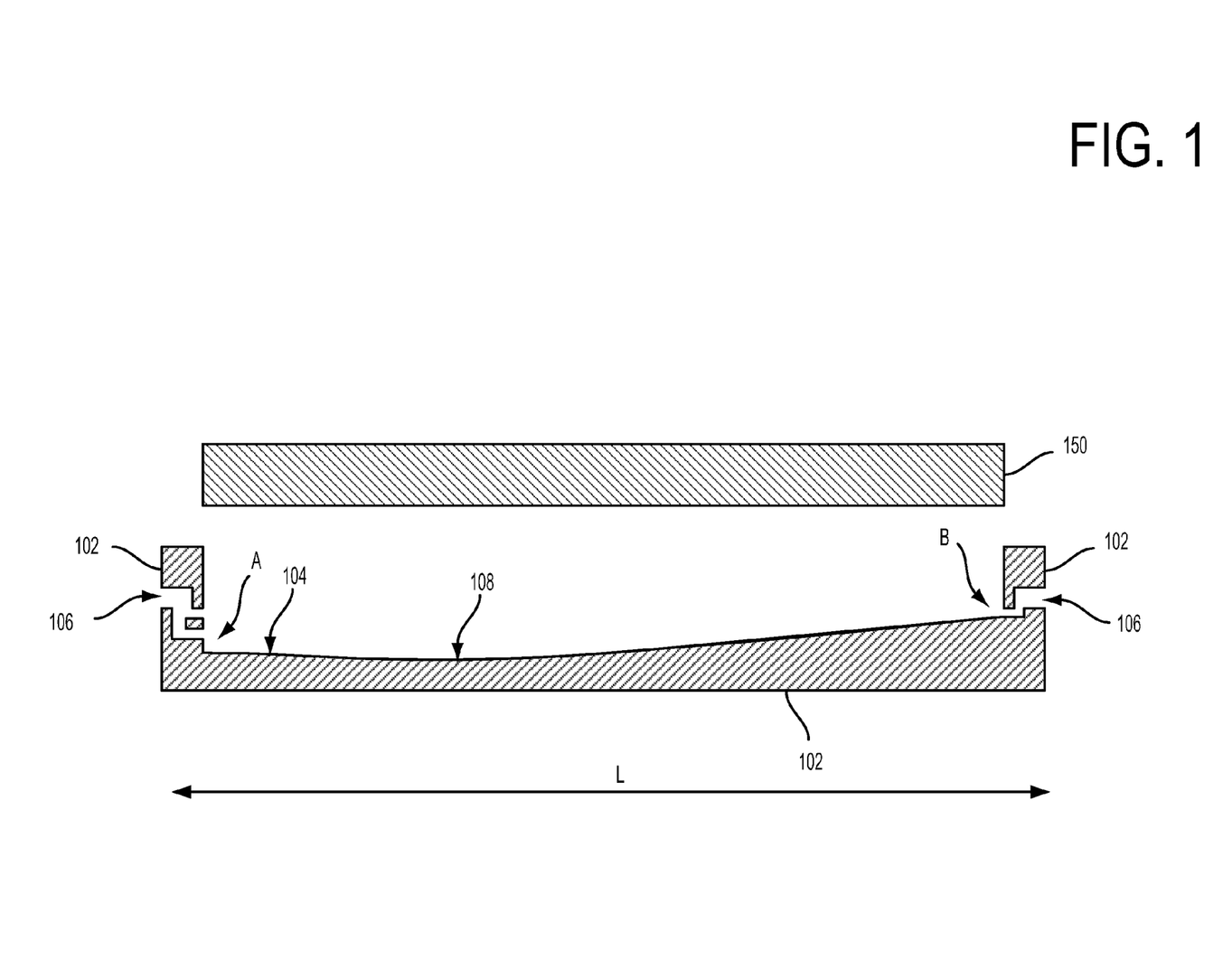
FIG. 1 is a schematic cross-sectional view of an embodiment of a vacuum molding tool, and of an embodiment of a wedge blank positioned over the vacuum molding tool.

FIG. 1 is a schematic view of an embodiment of a vacuum molding tool 102 for molding an optical wedge from a wedge blank 150, wherein wedge blank 150 is a starting material for molding an optical wedge. Wedge blank 150 may be made from any suitable material, including but not limited to an optical-grade material, such as acrylic PMMA, polycarbonate, polystyrene, etc. For example, in some embodiments, wedge blank 150 may be a cast acrylic sheet formed by curing a monomer poured between two float glass forms separated by a gasket. The resulting cast sheet may exhibit approximately similar average surface roughness values as those of the float glass forms, which in some embodiments may be 2 nm RA or less. Thus, the surface of wedge blank 150, in some embodiments, may have an average surface roughness of approximately 2 nm RA or less, and in some embodiments, 1 nm RA or less.

Wedge blank 150 may have any suitable dimensions. For example, in some non-limiting example embodiments, wedge blank 150 may have a pre-processing thickness of approximately 1 mm-20 mm. Because some acrylic polymerization processes result in approximately 12%-24% shrinkage of the acrylic material as the polymerization reactions progress, it will be appreciated that a thicker initial charge of monomer may be used in some embodiments to achieve such a final thickness for wedge blank 150.

Vacuum molding tool 102 includes one or more vacuum ports 106 fluidly connected to a vacuum pump (not shown) and configured to channel air and/or other gases from the vacuum molding tool 102 toward the vacuum pump. It will be appreciated that any suitable vacuum pump may be employed within the scope of the present disclosure. In some embodiments, vacuum molding tool 102 may be mounted on a stabilized surface, such as an optical mount platform, to provide a level surface for the molding and casting operations described in more detail.

Vacuum molding tool 102 also includes a molding surface 104 configured to provide a form for shaping a molded surface of the optical wedge into a desired profile. For example, in FIG. 1, molding surface 104 exhibits an optical surface profile that changes in thickness along a direction L running from end A of vacuum molding tool 102 to an opposite end B. Ends A and B correspond respectively to thick and thin edges of the resulting optical wedge. Thus, the optical wedge fabricated in vacuum molding tool 102 of FIG. 1 will exhibit an optical surface profile matching the optical surface profile of molding surface 104. It will be appreciated that the optical surface profile of molding surface 104 may have any suitable profile along a length and/or a width of molding surface 104 to achieve optical and/or structural characteristics for a particular end-use application, provided sufficient atmospheric pressure to overcome a stress opposing temporary formation of wedge blank 150 to the optical surface profile of molding surface 104.

In some embodiments, molding surface 104 may include one or more local topographic characteristics 108, each of which is configured to impart a corresponding complementary topographic feature to the finished optical wedge. For example, in the scenario shown in FIG. 1, local topographic characteristic 108 is shown as a thickness maximum configured to impart an aspherical optical feature to the finished optical wedge. It will be appreciated that molding surface 104 may be formed by any suitable process, such as by machining with a milling tool such as a computer numeric controlled (CNC) machine tool. Further, it will be appreciated that molding surface 104 may be processed with any suitable surface treatment, such as by electropolishing, chemical mechanical polishing, etc. to provide a suitably smooth molding surface.

Figure 2:
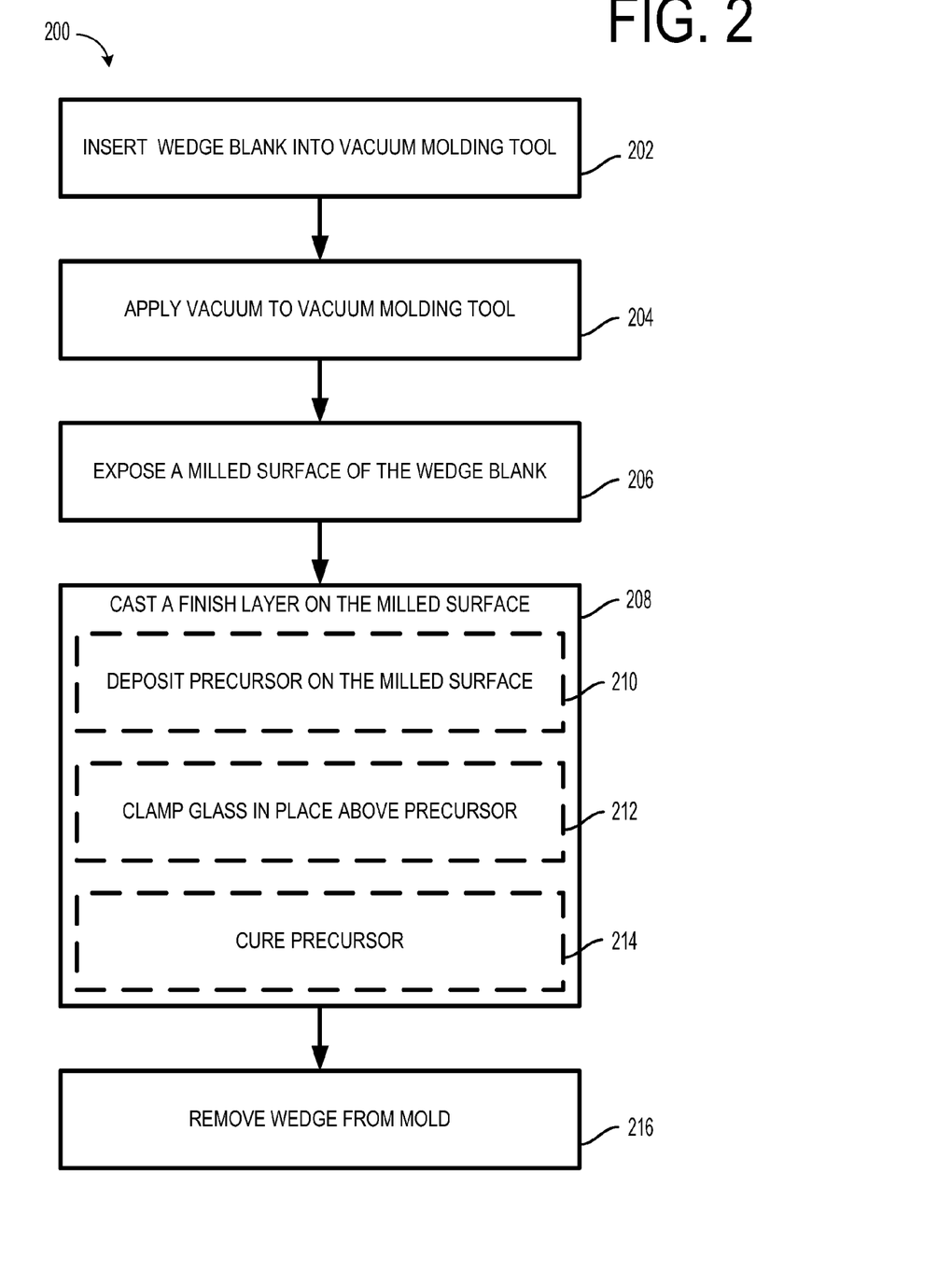
FIG. 2 is a flowchart depicting an embodiment of a method of fabricating an optical wedge.

FIG. 2 is a flowchart showing an embodiment of a method 200 for operating a vacuum molding tool for fabricating an optical wedge. It will be appreciated that method 200 may be performed by any suitable vacuum molding tool for fabrication of an optical wedge, and is not limited to the embodiments described herein.

Figure 3:
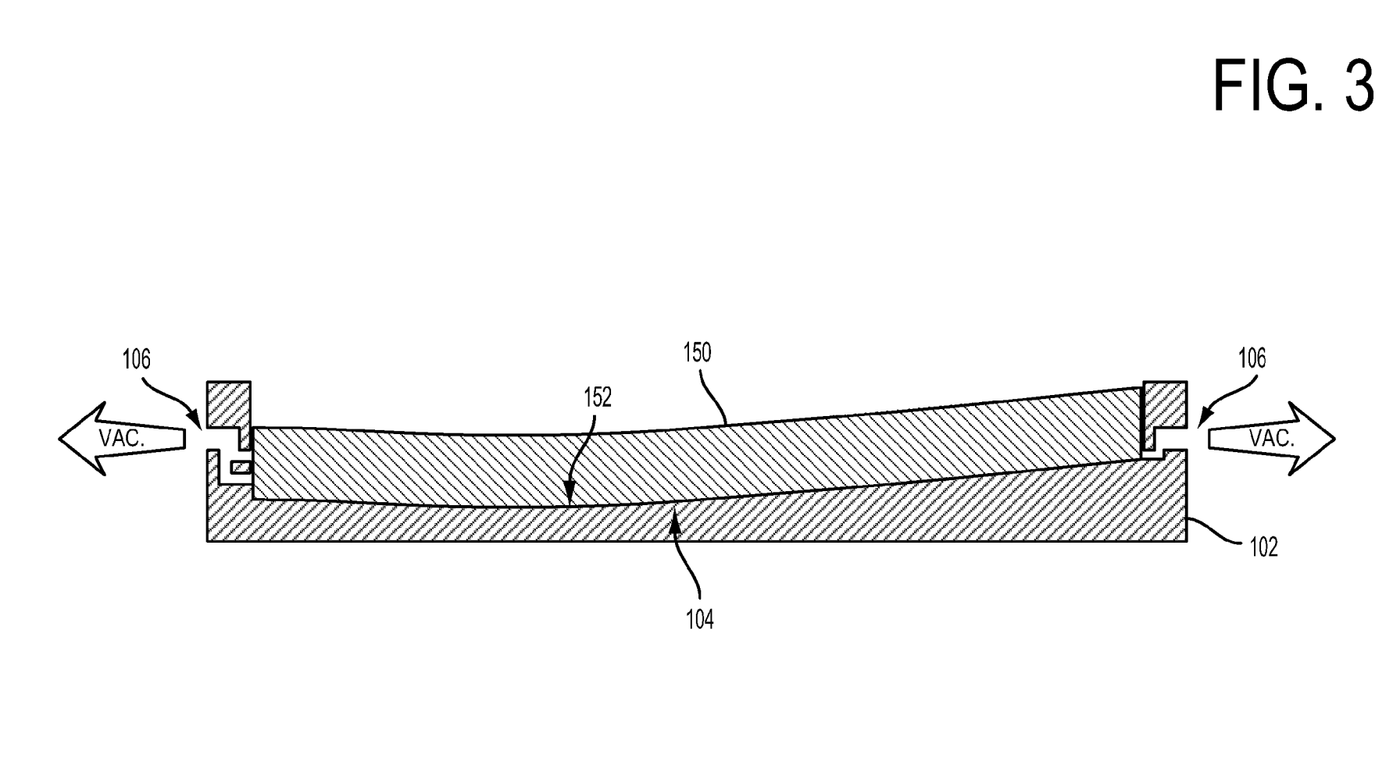
FIG. 3 is a schematic cross-sectional view of an embodiment of the vacuum molding tool of FIG. 1 showing a wedge blank inserted into the vacuum molding tool.

Method 200 comprises, at 202, inserting a wedge blank into a vacuum molding tool. For example, FIG. 3 shows a cross-sectional view of wedge blank 150 inserted into vacuum molding tool 102. Continuing, method 200 comprises, at 204, applying a vacuum to the mold. In the example shown in FIG. 3, a vacuum has been applied to vacuum molding tool 102 via vacuum ports 106. Application of the vacuum causes wedge blank 150 to be pressed against molding surface 104, so that the optical surface profile of molding surface 104 is imparted to molded surface 152 of wedge blank 150. Thus, in a scenario where a cast acrylic blank is inserted into wedge molding tool 102, the cast acrylic molding surface may be conformed to the shape of the optical surface profile and yet retain the surface smoothness native to the cast acrylic blank.

Figure 4:
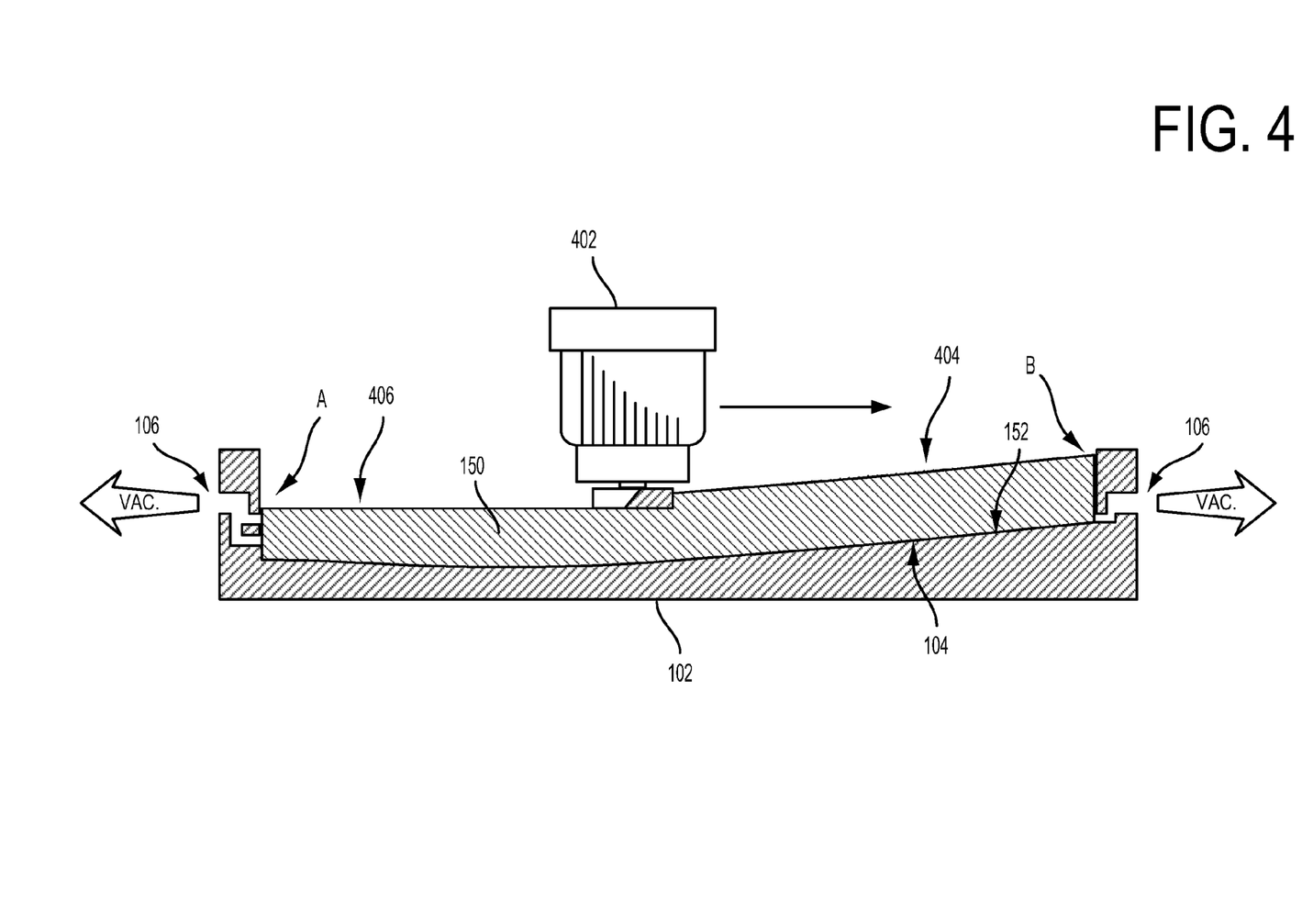
FIG. 4 is a schematic cross-sectional view of an embodiment of the vacuum molding tool of FIG. 1 showing a machined surface of the wedge blank being exposed.

Continuing, method 200 comprises, at 206, removing a portion of the top surface of the wedge blank while the vacuum molding tool is still under vacuum. For example, FIG. 4 shows a cross-sectional view of wedge blank 150 inserted into vacuum molding tool 102. Top surface 404 of wedge blank 150 is being machined by milling machine 402 to produce machined surface 406. It will be appreciated that any suitable machining process may be employed to form machined surface 406. For example, in the scenario shown in FIG. 4, a CNC milling machine equipped with a fly cutter bit may be used to produce machined surface 406. As a result of the machining process, the A end of the wedge blank is thicker than the B end. In some embodiments, the top surface of the wedge blank may be machined into a planar surface; in some other embodiments, the top surface of the wedge blank may be machined into another suitable topography. In some embodiments, as much as 50 percent of the wedge blank may be removed by machining, while in other embodiments either more or less material may be removed.

Figure 5:
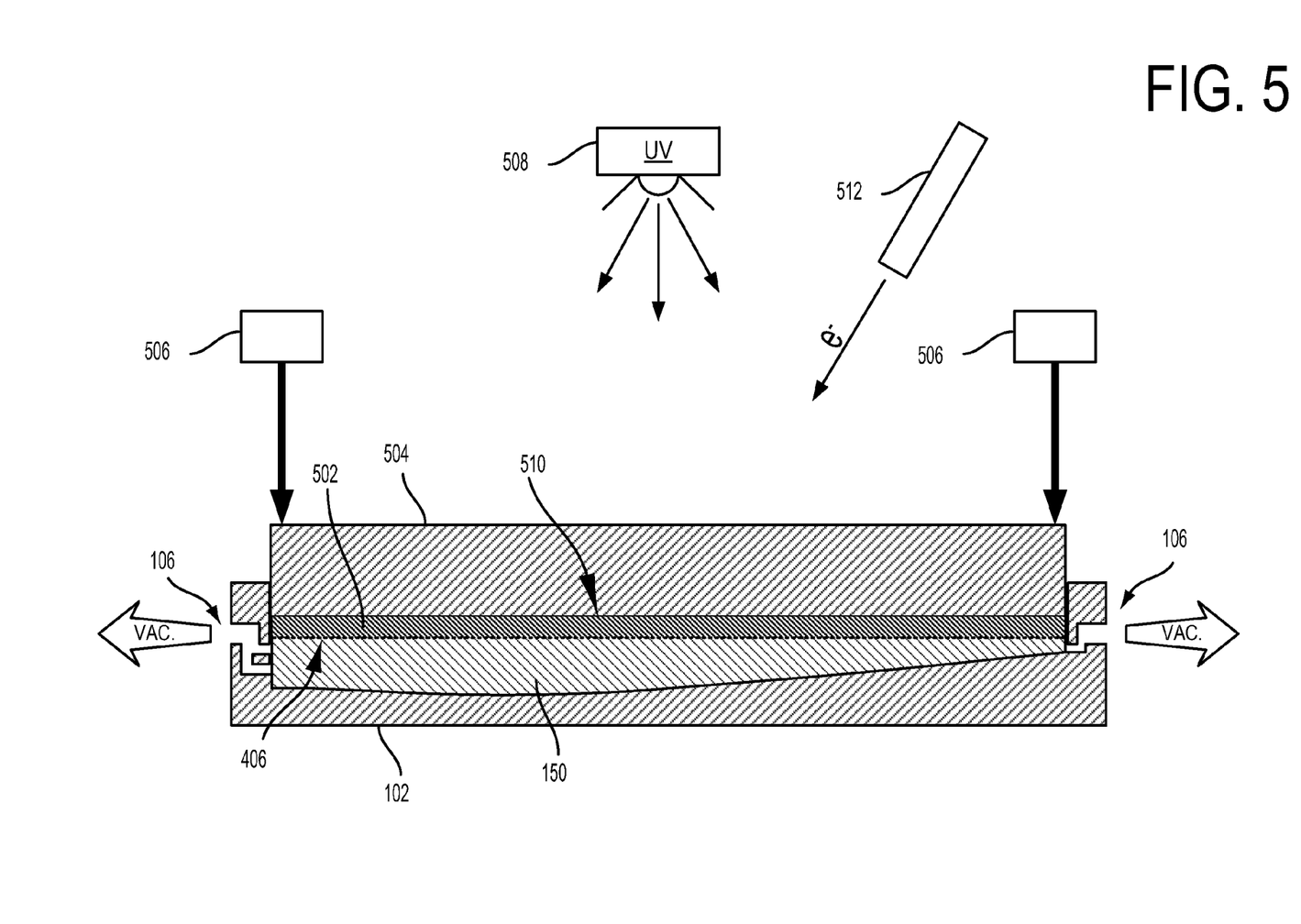
FIG. 5 is a schematic cross-sectional view of an embodiment of the vacuum molding tool of FIG. 1 showing a finish layer cast on top of the machined surface of the wedge blank.

The machined surface of the wedge blank may have a surface roughness greater than desired for some applications of the finished optical wedge. Thus, method 200 comprises, at 208, casting a finish layer in-situ on the machined surface of the wedge blank while the vacuum molding tool is still under vacuum. For example, FIG. 5 shows a cross-sectional view of machined surface 406 of wedge blank 150, on which a finish layer 502 has been cast. Finish layer 502 may be any suitable material having an index of refraction sufficiently matched to the index of refraction of the wedge blank material. For example, in some embodiments, the index of refraction of the wedge blank material may be within +/−0.01 of the index of refraction of the precursor material when cured. As a more specific example, PMMA has a refractive index of 1.492. Thus, a casting polymer for casting a finish layer onto a PMMA wedge blank may have an index of refraction between 1.482 and 1.502. It will be understood this specific example is described for the purpose of illustration, and is not intended to be limiting in any manner. In some embodiments, the indices of refraction may be sufficiently matched so that the interface formed between finish layer 502 and machined surface 406 will be invisible. For example, in a scenario where wedge blank 150 is a cast PMMA acrylic blank, finish layer 502 may be cast in-situ from PMMA, and will thus have approximately the same index of refraction (n approximately 1.5) as wedge blank 150.

Accordingly, process 208 may comprise, at 210, depositing a precursor for the finish layer on the machined surface of the wedge blank. Thus, in a scenario where the finish layer is PMMA, methyl methacrylate monomer (MMA) may be deposited on machined surface 406 for subsequent polymerization into PMMA. This deposition may be performed in any suitable fashion. For example, in some embodiments, liquid precursor material may be deposited via pouring, spraying in a pattern, injected in preparation for a reaction injection molding process, etc. Further, the precursor may be deposited in any suitable thickness to achieve a final finish layer thickness suited to an application of the finished optical wedge. For example, in one scenario, 100 microns thickness of precursor may be deposited on the machined surface. Alternatively, in some embodiments, the precursor may be a molten thermoplastic polymer of suitable refractive index formulated for injection molding of finish layer 502.

It will be appreciated that any suitable precursor formulation may be used. For example, in some embodiments, a mixture of precursor materials, such as a monomer and a suitable solvent may be combined to create a precursor formulation having a viscosity within a range of approximately 10 cp-400 cp. Formulations within the higher viscosity end of this range may be easy to handle during the deposition process, while formulations within the lower viscosity end of this range may more readily wet the machined surface, etc. It will be appreciated that this range is merely illustrative, and that any suitable viscosity achieved by any suitable precursor formulation may be utilized.

Continuing, 208 may further comprise, at 212, positioning and retaining, such as by clamping, a casting plate in continuous contact with a top surface of the precursor while the vacuum molding tool is still under vacuum. For example, FIG. 5 shows casting plate 504 retained within vacuum molding tool 102 above finish layer 502 under the downward force of clamps 506 located at the edges of casting plate 504. Optionally, in some embodiments, additional downward force may be applied elsewhere on the casting plate.

Casting plate 504 may be any suitable material exhibiting a surface roughness characteristic to be imparted onto a diffuser interface surface 510 of finish layer 502. For example, in some embodiments, casting plate 504 is a glass plate, such as a borosilicate float glass plate, having an average surface roughness of approximately 2 nm RA or less. Further, in some embodiments, casting plate 504 may be configured to avoid bowing, so that diffuser interface surface 510 is approximately flat on the finished optical wedge. For example, in one scenario, casting plate 504 may be approximately 20 mm-25 mm thick to provide structural rigidity and avoid bowing or deflection in casting plate 504. In another scenario, the casting plate may include one or more structural ribs, members, etc. (not shown) to provide structural rigidity.

In some embodiments, a finish layer interface surface of casting plate 504 may be conditioned with a mold release agent adsorbed to the finish layer interface surface of the casting plate. The mold release agent may be configured to repel the precursor formulation. For example, the mold release agent may be a suitable silicone compound or a fluorocarbon compound, though it will be appreciated that other suitable mold release agents may be employed within the scope of the present disclosure. In some embodiments, casting plate 504 is separated from wedge blank 150 only by finish layer 502 so that an edge bead is formed, while in other embodiments, a gasket may be included around a perimeter of casting plate 504 to avoid formation of an edge bead. For example, in an embodiment where molten polymer is used as a precursor, a gasket may be included to provide a space between machined surface 406 and casting plate 504 to facilitate an injection molding process.

In some embodiments, electrostatic potentials of casting plate 504, vacuum molding tool 102, and/or wedge blank 150 may be controlled to avoid differential charging at machined surface 406 and/or at the finish layer interface surface of casting plate 504. This may beneficially enhance wetting of the precursor on machined surface 406 and/or the finish layer interface surface of casting plate 504, avoid bubble formation on said surfaces, etc. In one scenario, control of the electrostatic potentials may be via an electron flood supplied via ionizer gun 512. In other embodiments, any other suitable mechanism may be used to reduce electrostatic potential differences between surfaces.

Continuing, process 208 further comprises, at 214, curing the precursor. In the embodiment shown in FIG. 5, an ultraviolet source 508 is configured to cure, finish layer 502 via ultraviolet (UV) light, which may be supplied by a UV lamp. It will be appreciated that any other suitable curing mechanism may used, including but not limited to thermal curing, etc. Once cured, finish layer 502 may help to maintain molded surface 152 in the conformation imparted by the profile of molding surface 104. In some embodiments, 214 may further include one or more post-cure annealing processes. Such post-cure processes and/or treatments may modulate stress within the finished optical wedge.

Figure 6:
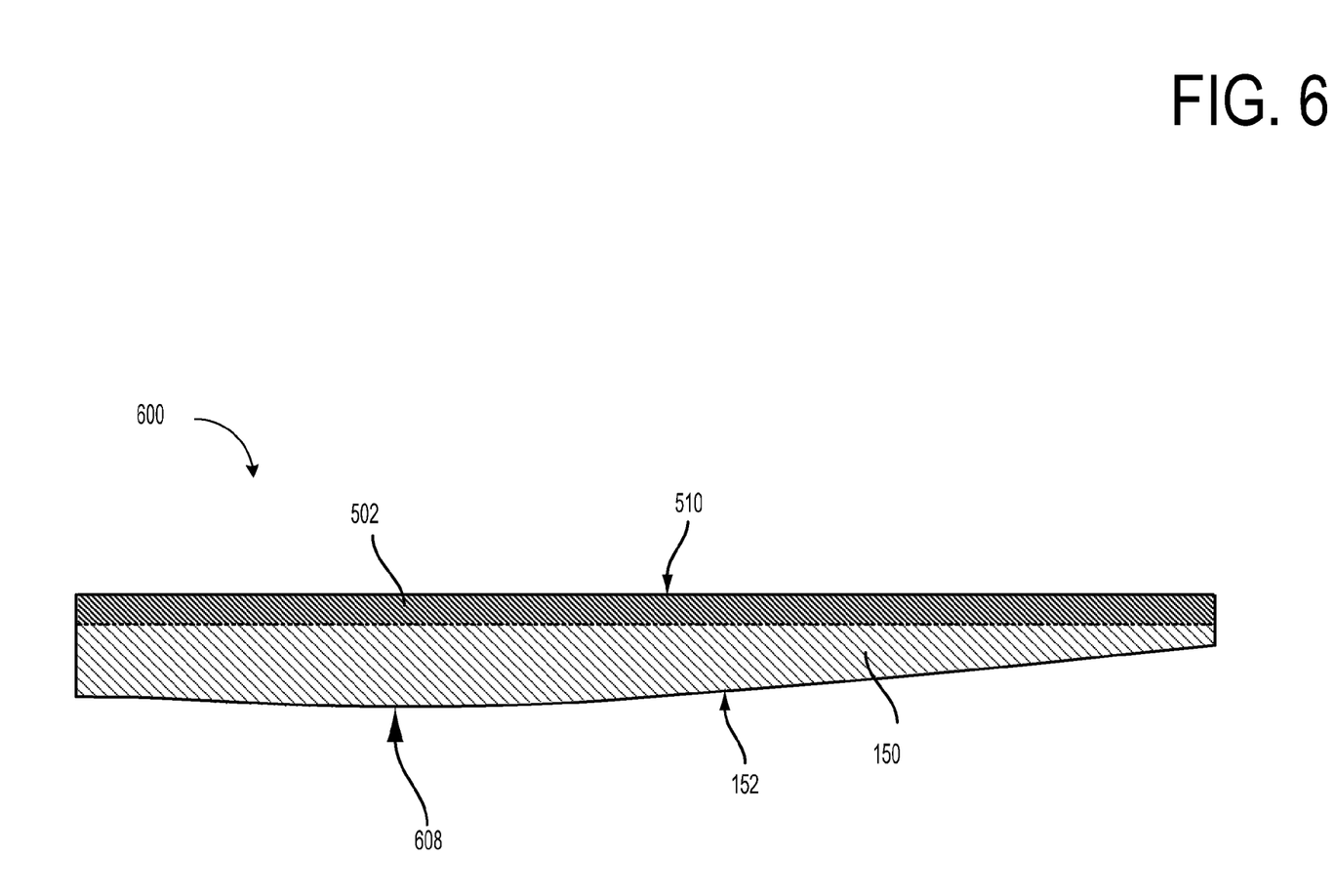
FIG. 6 is a schematic cross-sectional view of a finished optical wedge produced by the vacuum molding tool embodiment of FIG. 1.

Method 200 next comprises, at 216, disconnecting the vacuum from the vacuum molding tool and removing the finished optical wedge from the vacuum molding tool. For example, FIG. 6 shows a cross-section of an example finished optical wedge 600 taken along the same plane as the cross-sections of FIG. 1 and FIGS. 3-5. Finished optical wedge 600 includes finish layer 502 with an optically smooth surface 510. Finished optical wedge 600 also includes molded surface 152, which has been conformed to the optical surface profile of molding surface 104. Further, in the example shown in FIG. 6, finished optical wedge 600 includes local topographic characteristic 608, corresponding to local topographic characteristic 108 of molding surface 104.

Figure 7:
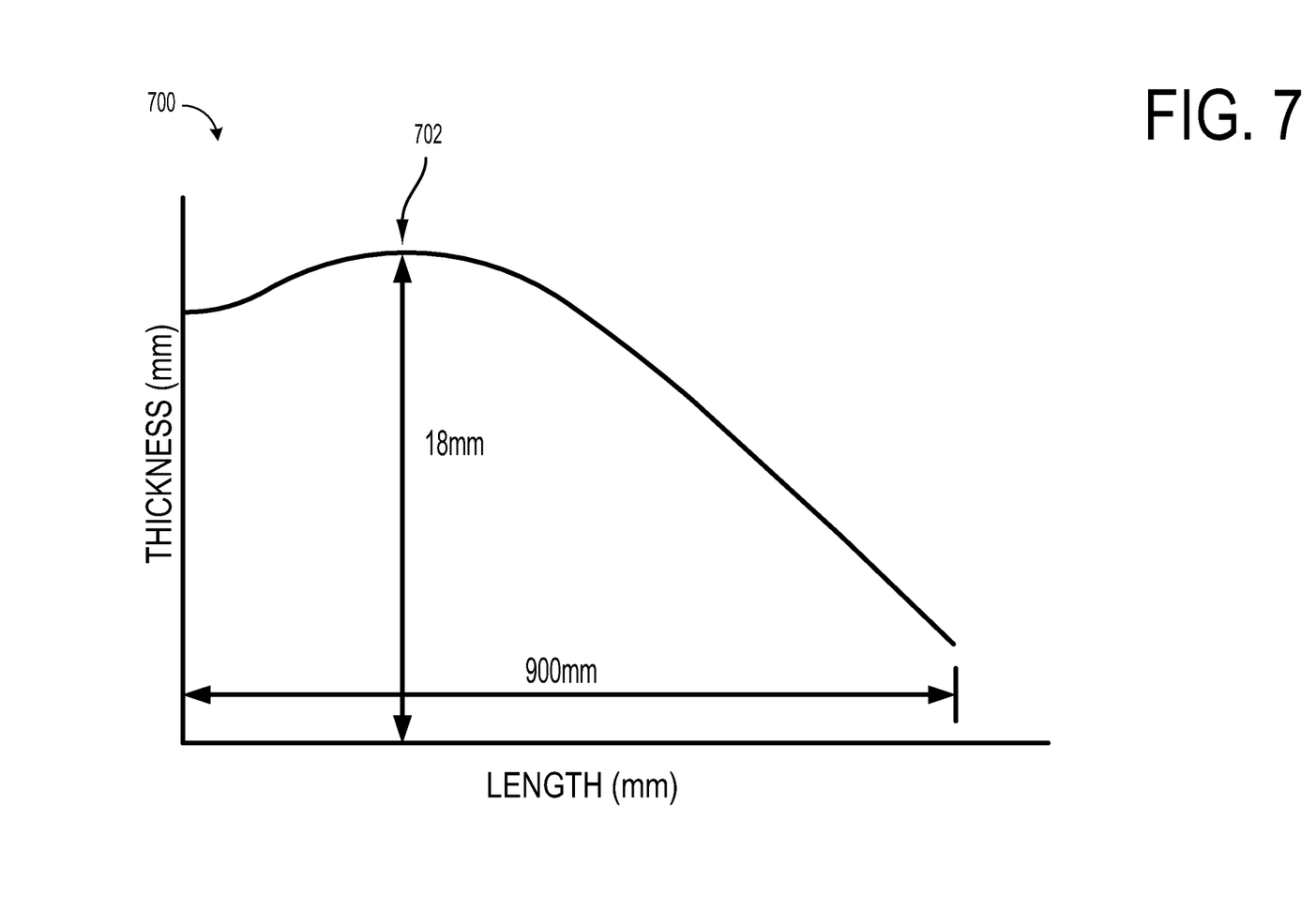
FIG. 7 is an exaggerated schematic view of a thickness profile of the finished optical wedge embodiment of FIG. 6.

By way of illustrating the thickness characteristics imparted to the finished optical wedge, FIG. 7 shows a schematic view of thickness profile of the cross-section of finished optical wedge 600 of FIG. 6. It will be appreciated that the effect of local topographic characteristic 608, represented by thickness reference 702, is greatly exaggerated in FIG. 7, as the scale of the horizontal (length) axis is greatly compressed in comparison to the scale of the vertical (thickness) axis.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of fabricating an optical wedge from a wedge blank using a vacuum molding tool, the method comprising:
inserting the wedge blank into the vacuum molding tool, the vacuum molding tool including a molding surface;
applying a vacuum to the vacuum molding tool to shape a molded surface of the wedge blank to the molding surface of the vacuum molding tool;
removing a layer from a surface of the wedge blank opposite from the molded surface of the wedge blank to expose a machined surface of the wedge blank;
casting a finish layer on top of the machined surface to maintain the molded surface in a shape imparted by the molding surface of the vacuum molding tool thereby forming a finished optical wedge; and
removing the finished optical wedge from the vacuum molding tool.

2. The method of claim 1, wherein casting a finish layer comprises:
depositing a precursor for casting the finish layer on top of the machined surface;
retaining a casting plate in contact with a top surface of the precursor; and
curing the precursor to form a cured polymer.

3. The method of claim 2, wherein depositing the precursor further comprises one or more of pouring the precursor on top of the machined surface, spraying the precursor in a pattern on top of the machined surface, and injecting the precursor into a space between the top of the machined surface and a finish layer interface surface of the casting plate.

4. The method of claim 3, wherein an index of refraction of the cured polymer is within +/−0.01 of an index of refraction of a wedge blank material.

5. The method of claim 2, further comprising conditioning a finish layer interface surface of the casting plate with a mold release agent.

6. The method of claim 5, further comprising preventing differential charging at the machined surface of the wedge blank and/or at the finish layer interface surface of the casting plate by controlling an electrostatic potential of one or more of the casting plate, the vacuum molding tool, and the wedge blank.

7. The method of claim 6, wherein controlling the electrostatic potential comprises supplying electrons to one or more of the casting plate, the vacuum molding tool, and the wedge blank with an ionizer gun.

8. The method of claim 1, wherein the machined surface is a planar surface.

9. The method of claim 8, wherein removing the layer from the surface of the wedge blank further comprises machining the surface of the wedge blank opposite from the molded surface with a milling machine.

10. A method of fabricating an optical wedge for a projection display surface from a wedge blank using a vacuum molding tool, the method comprising:
   inserting the wedge blank into the vacuum molding tool, the vacuum molding tool including a molding surface;
   applying a vacuum to the vacuum molding tool to shape a molded surface of the wedge blank to the molding surface of the vacuum molding tool;
   removing a layer from a surface of the wedge blank opposite from the molded surface to expose a machined surface of the wedge blank;
   depositing a precursor for casting a finish layer on top of the machined surface;
   clamping a casting plate in contact with a top surface of the precursor;
   curing the precursor to form the finish layer of a finished optical wedge to hold the molded surface in a shape of the molding surface of the vacuum molding tool; and
   removing the finished optical wedge from the vacuum molding tool.

11. The method of claim 10, further comprising preventing differential charging at the machined surface of the wedge blank and/or at a finish layer interface surface of the casting plate by controlling an electrostatic potential of one or more of the casting plate, the vacuum molding tool, and the wedge blank.

12. The method of claim 11, further comprising selecting the precursor so that an interface between the finish layer and the machined surface will be invisible.

* * * * *